Patented Feb. 8, 1949

2,461,193

UNITED STATES PATENT OFFICE 2,461,193

PROCESS OF TREATING WASTE MATERIAL CONTAINING RUBBER

Fernley H. Banbury, Woodmont, Donald A. Comes, Woodbridge, and Carl F. Schnuck, New Haven, Conn., assignors to Lancaster Processes, Inc., New York, N. Y., a corporation of New York No Drawing. Application August 13, 1947, Serial No. 768,510

16 Claims. (Cl. 260—5)

This invention relates to methods of treating waste or scrap material containing rubber in unvulcanized or partially vulcanized state, in order to convert these materials into a form in which they may be usefully employed.

More particularly, the invention relates to the treatment of waste or scrap rubberized fabric, such as friction stock, whether the rubber layer or component is in an uncured state or in partially vulcanized state, as well as to the treatment of so-called scorched rubber, i. e., rubber compounds which have been prematurely partially vulcanized, and to the treatment of rubber compounds improperly vulcanized.

In the manufacture of the various products from rubber compounds, premature vulcanization frequently occurs during the processing of the compound in such operations as milling, calendering, etc., and sometimes even during storage of the compound. Such premature vulcanization is particularly prevalent when so-called high power or fast acting accelerators are employed. The rubber in a sheet or slab of such scorched stock may be only partially vulcanized, although in some instances, the same slab contains both fully and partially vulcanized rubber. Also, in the manufacture of articles from rubber compounds, waste occurs in the form of material improperly vulcanized as a result of faulty weighing of the various ingredients of the compound or faulty processing thereof.

Scorched rubber and improperly vulcanized rubber, which are sometimes referred to as morgue stock, particularly such as contains mixtures of unvulcanized and partially vulcanized rubber, are difficult to handle in the usual known reclaiming processes, such as the acid or alkali digestion processes, owing, among other things, to the difficulty of reducing such material to uniform sized particles in order to condition it for treatment by such processes. Also, because of the non-uniform condition of the rubber in respect to the varying degree of vulcanization, these processes are capable of producing only an inferior or low grade of reclaim.

In the manufacture of articles from rubberized fabric, such as friction stock, wherein a layer or layers of rubber compound are united with a layer or layers of fabric, paper or the like, large quantities of waste necessarily accumulate during the production of such articles, in the form of irregularly shaped pieces or "trimmings" or "ends" resulting from the cutting or stamping of the articles into desired shape and size. In many cases also, rubberized fabric is considered waste because it is not of the proper gauge or because of improper formulation or compounding. Waste stock of this character has heretofore been treated by processes wherein only the rubber is recovered, the fibrous portion becoming destroyed by the chemicals used in the process. Other methods heretofore proposed for salvaging such waste have generally been impractical or uneconomical. Accordingly, at the present time, this waste is in many cases considered valueless, and is destroyed either by burning it or consigning it to a dump.

In accordance with our invention, we provide a method by which scorched or improperly vulcanized rubber compounds or waste rubberized fabric, such as uncured friction stock, can be converted profitably into useful products.

According to our invention, waste or scrap material of the character above-mentioned is reclaimed by subjecting it to intense mechanical action in a confined working space under conditions which will transform it into a substantially homogeneous mass, while simultaneously generating sufficient heat by the mechanical action to vulcanize the unvulcanized or partially vulcanized rubber component, and continuing this action until the rubber which has thus been transitorily vulcanized becomes devulcanized and substantially uniformly admixed with the other components of the starting material, such as the fibrous portion of waste rubberized fabric.

More particularly, according to the invention, the material is mechanically worked while confined under high mechanical compression, so as to bring about a high input of mechanical energy at a very rapid rate. In general the input of mechanical energy is such as to reach a peak not substantially less than 3 H. P. per pound of material, with an average not substantially less than 1.5 H. P. per pound, preferably about 2 H. P. per pound, for the period of time required to bring the material to a plasticized substantially homogeneous condition, enabling it to be sheeted, refined or otherwise processed as may be desired.

We have found that by subjecting waste or scrap material containing unvulcanized or partially vulcanized rubber to mechanical action of the character above set forth and as more fully hereinafter described, the material quickly, usually within a matter of one or two minutes, attains temperatures at which the rubber is substantially completely vulcanized, as evidenced by marked stiffening of the mass, and that by continuing this action, in which high internal friction and shear are exerted upon the material and the temperature of the mass thereby still further increased, the rubber becomes devulcanized and the mass converted into a substantially homogeneous plastic condition within a matter of several minutes.

The process of our invention may best be practiced by subjecting the waste or scrap to mechanical action in an internal mixer, suitably equipped to exert relatively high mechanical compression upon the material while it is being subjected to the shearing action of a bladed rotor or rotors operating at a speed which, in conjunction with the mechanical pressure exerted on the material, will result in an input of mechanical energy of the order above indicated.

Preferably there is employed, for this purpose, an internal mixer such as that well known as the Banbury mixer. This comprises, generally, a pair of cylindrical chambers arranged side by side and in communication, within each of which is mounted a bladed rotor, and a pneumatically operated ram for holding the material to be treated within the sphere of action of the rotors. This form of mixer has found extensive use in the rubber industry for mixing and massing of rubber compounds. For the purposes of the present invention, however, it is essential, in order to obtain the high input of mechanical energy referred to above, that the ram exert upon the material in the working chamber a pressure of from 50 to 250 pounds per square inch, desirably 80 to 160 pounds per square inch. For that purpose, the pneumatic cylinder for operating the ram may be enlarged and high pneumatic pressures may be utilized in the cylinder. Considering, for example, a size 3-A Banbury mixer of standard construction, which has a pneumatic cylinder of 8" in diameter, viz., a cross-sectional area of 50.265 square inches, and a ram whose working surface has an area of 252 square inches, an air pressure of 100 pounds per square inch in the cylinder provides a maximum pressure of approximately 20 pounds per square inch by the ram upon the material in the working chamber. As above indicated, in the practice of the present invention, the mechanical pressure exerted upon the material in the working chamber while it is undergoing the mechanical action of the rotors is of the order of 50 to 250 pounds per square inch, desirably 80 to 160 pounds per square inch.

In general, the mechanical pressure exerted upon the material in the practice of the present invention is from 2½ to 10 or more times the pressure exerted by the ram of the Banbury mixer as normally constructed and operated in rubber mixing and compounding practice.

In the case of a Banbury mixer of the size above referred to, to be employed in the practice of the present invention, the pneumatic cylinder is enlarged to a diameter not substantially less than 16 inches (201 square inches cross-sectional area). Hence, a pressure of 100 pounds per square inch in the cylinder for operating the ram (whose working surface has an area of 252 square inches) provides a pressure of 80 pounds per square inch by the ram upon the material in the working chamber. By increasing the air pressure in the cylinder, say up to 200 pounds per square inch, pressures of up to 160 pounds per square inch by the ram upon the material may be realized. If desired, the ram for exerting the necessary pressure on the material may be operated by hydraulic or oil pressure instead of air pressure, or by a combination of air pressure and oil or water pressure.

The heavy pressure thus exerted by the ram serves to force or crowd the material into the working chamber and densify and compact it therein so that it offers maximum resistance enabling the rotors to exert a heavy shearing action thereon as they plough through the densified mass.

In conjunction with the heavy pressure exerted by the ram upon the material in the chamber as above stated, the rotors are driven at a speed two or three times normal in rubber mixing and compounding practice. Thus, in the case of a Banbury mixer of the size above-mentioned, the rotors are operated at 70 to 105 R. P. M. as compared to 35 R. P. M. normal for this size machine. Generally speaking, the higher the pressure exerted by the ram, the lower may be the speed of the rotors. The heavy pressure exerted by the ram upon the material in the mixer, together with the abnormal speed of the rotors, makes possible a sustained high input of energy as a result of the heavy working of the material. By means of this input of energy, the material quickly, usually within a matter of one or two minutes, attains a temperature at which the unvulcanized or partially vulcanized rubber component undergoes substantially complete vulcanization, as evidenced by a marked and somewhat sudden stiffening of the mass, followed rather quickly, usually within a matter of 3 to 10 additional minutes of continued high input of mechanical energy, by a further rise in temperature thereof to within the range of 425° to 550° F., resulting in devulcanization of the rubber previously vulcanized in the earlier stage of the operation; simultaneously the mass is rendered substantially homogeneous.

The effects upon unvulcanized rubber compound, when subjected to treatment according to our invention, are demonstrated by the following data: Unvulcanized rubber compound comprising the coated layer of a fabric intended for use as a diaphragm stock, was stripped from the fabric and 1670 grams of this compound were charged into a size B Banbury mixer and subjected to the mechanical action thereof, with the rotors operated at a speed of 242 R. P. M. and with an air pressure of 100 pounds per square inch applied to the cylinder operating the ram. The cross-sectional area of the cylinder was 23.7 square inches and the working face of the ram had an area of 14.25 square inches. Thus, the ram exerted a pressure of approximately 160 pounds per square inch upon the material in the working chamber. After about 30 seconds run, during which time the power input descended from about 25 H. P. to about 20 H. P. as a result of the action upon the relatively soft unvulcanized material, the H. P. input climbed abruptly from about 20 to somewhat above 40 H. P., indicating that the compound must have become very stiff. This considerable stiffening is evidently accountable to the fact that the temperature of the mass had risen to above that at which the rubber passed through the vulcanization stage. The H. P. input stayed at somewhat above 40 H. P. for the ensuing 15 or 20 seconds of continued operation, when it began gradually to descend as the now vulcanized rubber became softer. At about 4½ minutes from the start of the operation, the temperature of the batch had risen to 440° F., at which time the pressure of the ram upon the material was released, the speed of the rotors was reduced to 80 R. P. M., and cooling water was circulated through the jacketed parts of the mixer. In about 3 minutes, the temperature of the material had been reduced to about 275° F., whereupon, the batch was discharged. After refining, a sample of this material, heated to 300° F. in a press for 25 minutes, appeared to be little, if any, vulcanized; whereas, a sample of the unvulcanized rubber compound used as the starting material, when subjected to the same press heating condition, became cured and exhibited excellent physical properties. However, when a sample of the material which had been processed as above described was compounded with 3% sulphur, 5% zinc oxide, 0.75% Captax, 0.2% diphenyl-guanidine and 1% stearic acid, and the sample then subjected to the same curing conditions as previously described, it became cured and exhibited physical properties substantially the same as those exhibited by the sample of the unprocessed material after the latter had been cured, as described. Thus, it appears that when treating unvulcanized but vulcanizable rubber compounds according to our process, it is changed in its nature to the extent that it becomes largely non-vulcanizable, being first transitorily vulcanized in the early stage of the operation and then devulcanized in the later stage of the operation, but that when vulcanizing agents are added thereto, it can be cured in a normal manner.

In operating our process, we have been able to obtain useful reclaim from partially vulcanized scorched rubber compounds or compounds containing mixtures of such partially vulcanized rubber with unvulcanized rubber, in as little as three to five minutes; likewise, we have been able by this process to obtain useful products from the treatment of various types of rubberized fabric, such as uncured friction stock, in as little time as three to five minutes. Generally speaking, we have obtained these results with a Banbury mixer equipped to carry out the process, on the basis of four to six cycles per hour, including in each cycle the time required to cool the batch before discharging it from the mixer.

The process herein described may be used not only for the treatment of scorched rubber, rubberized fabric, and improperly vulcanized rubber wherein the rubber consists of natural rubber, but also for the treatment of these materials wherein the rubber consists of synthetic rubber, such as the copolymer of 1,3-butadiene and styrene, commonly known as GR-S, the copolymer of 1,3-butadiene and acrylonitrile, commonly known as Buna N, or the copolymer of isobutylene and isoprene, commonly known as butyl rubber; as well as for the treatment of mixtures of such waste or scrap containing mixtures of such synthetic rubber with natural rubber.

The term "rubbery butadiene polymer" in the claims is intended to include, generically, natural rubber as well as to the so-called synthetic butadiene polymer rubbers, such as the copolymers of the types herein mentioned.

In practicing the process of the invention, the material to be treated may, if desired, be first reduced to relatively small size pieces, although this is not in all cases essential. Thus, in the case of scorched rubber or so-called morgue stock, this may be loaded into the mixer in the sheet or slab form, usually about 24" x 24" in area and ¾" thick, in which it is available. Likewise, uncured friction stock or other rubberized fabric may be loaded into the mixer in the form of trimmings, as they come, which may be in the form of pieces of say 4" x 4" in area, and ¼" thick and often with a number of such pieces attached to one another by narrow strips of the material from which they are cut, or even in the form of bundles in which this type of material is frequently available.

Having in mind that the high input of mechanical energy contemplated by the present invention necessitates imposition of relative high mechanical pressure upon the material in the working chamber, the quantity of material per batch charged to the working chamber must be such that the pressure exerted by the ram shall force or crowd the material into the mixing chamber so as to densify and compact it to a degree that will enable the rotors to exert the maximum shearing action which will bring about the necessary input of mechanical energy. The quantity of material in each batch must be sufficiently large so that when the full pressure of the ram is applied to the material, the working face of the ram will be within about one-half inch of its limit stops. If the size of the batch is substantially in excess thereof, the portions thereof in the throat or feed neck will not be subjected to the working action of the rotors during the cycle of operation, remaining to contaminate the resultant product. On the other hand, if the size of the batch is substantially less than that indicated, the effectiveness of the ram pressure in increasing the work done on the material is lost. The weight of the charge in the case of any given material will depend upon its specific gravity. In the case of a size 3-A Banbury mixer, for example, the weight of material per batch, assuming it has a typical specific gravity of 1.25, will usually vary from about 140 to about 165 pounds. This compares with a batch weight of 100 to 115 pounds for this size Banbury mixer as normally constructed and operated in rubber compounding practice, for stock of 1.25 specific gravity.

Desirably, suitable softening oils in amounts of from say 2% to 15% by weight of the charge, and attriting powders such as carbon black or Silene (which is a hydrated calcium silicate containing approximately 67% $SiO_2$ and 19% $CaO$), in amounts of from say 10% to 15% by weight, depending upon the nature of the material being treated and the quality of reclaim desired to be produced therefrom, may be added to the batch to assist the reclaiming operation and improve the milling and other properties of the material upon discharge from the working chamber.

When the batch of proper weight has been loaded into the mixer, the necessary air pressure is fed to the pneumatic cylinder operating the ram so that the latter will force the material into the working chamber and compact and densify it therein, preferably while the rotors are revolving at the maximum speed. Within a matter of one or two minutes, the temperature of the mass rises quite rapidly and the mass becomes considerably stiffened, owing to the fact that the temperatures attained have been sufficient to cause the unvulcanized or partially vulcanized rubber component of the mass to become substantially completely vulcanized. Thereafter, the power input is maintained, or may even rise still further, for a brief period, but soon begins to drop gradually as the action is continued, the temperature of the stock continuing to rise until the initially vulcanized rubber component becomes devulcanized and the mass transformed into more or less homogeneous plasticized condition. The fabric, if present, becomes disintegrated and uniformly distributed through the mass. When the mass has attained the desired temperature in the range of 425° to 550° F., it is substantially uniform, and further high input of mechanical energy is no longer advantageous. The batch may thereupon be cooled and discharged from the apparatus.

Since, as indicated above, the peak temperature attained by the batch will be of the order of 425° to 550° F., it is necessary, in order to prevent harmful oxidation of the rubber which would result if it were brought into contact with the atmosphere at such high temperature, to cool the batch to a temperature within the range of 275°–350° F., before discharging it from the mixer. Such cooling may be effected by circulating cold water through the jackets with which the working chamber and the rotor or rotors are usually provided, or by injecting water into the mass of material in the working chamber, or by both of these expedients. In either case, the cooling action may be further assisted by reducing the speed of the rotor or rotors.

The batch may be discharged and sheeted or pelletized without first cooling it, if its condition is such that it can be sheeted or pelletized at the discharge temperature without injury to the devulcanized rubber; in such cases it may be desirable to discharge it from the mixer at the conclusion of the devulcanizing stage, through an enclosed substantially air-sealed or inert conduit, directly to a cool sheeting mill to be simultaneously cooled and sheeted, or to a pelletizer.

We claim:

1. A process of treating a waste rubber stock having an unvulcanized rubbery butadiene polymer as a component thereof, which comprises subjecting a mass of such stock in a confined working space to intense shearing action while exerting mechanical pressure thereon to compact and densify the mass, the pressure being sufficiently high to enable said shearing action to develop a power input averaging at least about 1.5 horsepower per pound of stock for a period of time within the range of approximately three to twelve minutes, the lower the said average horsepower per pound the longer the said period of time and vice versa, thereby causing the polymer to become substantially vulcanized in the early stage of said period of time and the thus vulcanized polymer to become devulcanized and the mass converted into a substantially homogeneous plastic condition in the subsequent stage of said period of time.

2. A process as defined in claim 1, wherein said unvulcanized polymer component comprises a copolymer of a butadiene and styrene.

3. A process as defined in claim 1, wherein said unvulcanized polymer component comprises natural rubber.

4. A process as defined in claim 1, wherein said unvulcanized polymer component comprises a mixture of natural rubber and a copolymer of a butadiene and styrene.

5. A process as defined in claim 1 wherein said unvulcanized polymer component comprises a copolymer of a butadiene and isobutylene.

6. A process as defined in claim 1 wherein said unvulcanized polymer component comprises a mixture of natural rubber and a copolymer of a butadiene and isobutylene.

7. A process as defined in claim 1, wherein said stock comprises rubberized fabric.

8. A process as defined in claim 1, wherein said stock comprises scorched rubber.

9. A process of treating a waste rubber stock in which the rubber component comprises an unvulcanized but vulcanizable rubbery butadiene polymer, said process comprising subjecting a mass of such waste in a confined working space to intense shearing action while exerting mechanical pressure thereon to compact and densify the mass and to raise the temperature thereof above the vulcanization temperature of the polymer, continuing such shearing action until the mass attains a temperature within the range of 425 to 550° F., said pressure being sufficiently high and so related to the speed of the shearing action as to develop a power input averaging at least 1.5 horsepower per pound of stock, thereby causing said temperature to be attained and the mass to be transformed into a substantially homogeneous plastic condition within a period of approximately three to twelve minutes, the lower the said average horsepower per pound the longer the said period of time and vice versa.

10. A process as defined in claim 9, wherein said unvulcanized polymer component comprises a copolymer of a butadiene and styrene.

11. A process as defined in claim 9, wherein said unvulcanized polymer component comprises natural rubber.

12. A process as defined in claim 9, wherein said unvulcanized polymer component comprises a mixture of natural rubber and a copolymer of a butadiene and styrene.

13. A process as defined in claim 9 wherein said unvulcanized polymer component comprises a copolymer of a butadiene and isobutylene.

14. A process as defined in claim 9 wherein said unvulcanized copolymer component comprises a mixture of natural rubber and a copolymer of a butadiene and isobutylene.

15. A process as defined in claim 9, wherein said stock comprises rubberized fabric.

16. A process as defined in claim 9, wherein said stock comprises scorched rubber.

FERNLEY H. BANBURY.
DONALD A. COMES.
CARL F. SCHNUCK.

REFERENCES CITED

The following references are of record in the file of this patent:

UNITED STATES PATENTS

| Number | Name | Date |
| --- | --- | --- |
| 1,957,298 | Shepard et al. | May 1, 1934 |
| 2,221,490 | Robinson | Nov. 12, 1940 |
| 2,359,122 | Kirby | Sept. 26, 1944 |
| 2,408,296 | Cotton | Sept. 24, 1946 |

OTHER REFERENCES

"Rubber Age" (N. Y.) of August 1946, pp. 563, 566.